US007507482B2

(12) United States Patent
Bruce et al.

(10) Patent No.: US 7,507,482 B2
(45) Date of Patent: Mar. 24, 2009

(54) CERAMIC COATING MATERIAL

(75) Inventors: Robert William Bruce, Loveland, OH (US); Ramgopal Darolia, West Chester, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 11/164,607

(22) Filed: Nov. 30, 2005

(65) Prior Publication Data

US 2008/0113211 A1 May 15, 2008

(51) Int. Cl.
*B32B 9/00* (2006.01)

(52) U.S. Cl. ...................... 428/469; 428/472; 428/701; 428/702; 416/241 B

(58) Field of Classification Search ................ 428/632, 428/701, 702; 416/241 B
See application file for complete search history.

(56) References Cited

U.S. PATENT DOCUMENTS

| | | | | |
|---|---|---|---|---|
| 4,753,902 | A | 6/1988 | Ketcham | 501/87 |
| 4,774,150 | A | 9/1988 | Amano et al. | 428/690 |
| 4,916,022 | A * | 4/1990 | Solfest et al. | 428/623 |
| 6,025,078 | A | 2/2000 | Rickerby et al. | 428/469 |
| 6,127,006 | A | 10/2000 | Schulz et al. | 427/585 |
| 6,284,323 | B1 | 9/2001 | Maloney | 427/419.2 |
| 6,352,788 | B1 | 3/2002 | Bruce | |
| 6,586,115 | B2 | 7/2003 | Rigney et al. | 428/633 |
| 6,686,060 | B2 | 2/2004 | Bruce et al. | 428/633 |
| 6,890,668 | B2 | 5/2005 | Bruce et al. | 428/632 |
| 2002/0172838 | A1 | 11/2002 | Rigney et al. | |
| 2003/0215665 | A1 | 11/2003 | Bruce et al. | |
| 2003/0224200 | A1 | 12/2003 | Bruce | 428/632 |
| 2004/0043244 | A1 | 3/2004 | Bruce et al. | |
| 2005/0026770 | A1 * | 2/2005 | Zhu et al. | 501/103 |
| 2005/0112412 | A1 | 5/2005 | Darolia et al. | |
| 2005/0142394 | A1 | 6/2005 | Spitsberg et al. | |

OTHER PUBLICATIONS

Pandolfelli, V.C., et al; "Sintering and Microstructural Studies in The System ZrO2 . TiO2 . CeO2"; Journal of Materials Science, Springer/Business Media, Dordrecht, NL; vol. 25, No. 4, Apr. 1990; pp. 2233-2244.

* cited by examiner

*Primary Examiner*—Timothy M Speer
(74) *Attorney, Agent, or Firm*—William Scott Andes; Gary M. Hartman; Domenica N. S. Hartman

(57) ABSTRACT

A ceramic material suitable for use as a coating, such as a porous thermal barrier coating (TBC) on a component intended for use in a hostile thermal environments. The coating material consists essentially of zirconia stabilized by at least one rare-earth metal oxide and further alloyed to contain a limited amount of titania. Rare-earth metal oxides of particular interest are lanthana, ceria, neodymia, europia, gadolinia, erbia, dysprosia, and ytterbia, individually or in combination. Zirconia, the rare-earth metal oxide, and titania are present in the coating material in amounts to yield a predominantly tetragonal phase crystal structure. The amount of titania in the coating is tailored to allow higher levels of stabilizer while maintaining the tetragonal phase, i.e., avoiding the cubic (fluorite) phase.

19 Claims, 1 Drawing Sheet

CERAMIC COATING MATERIAL

This invention was made with government support under Contract No. N00019-96-C-0176 awarded by awarded by the JSF Program Office. The Government has certain rights in the invention.

BACKGROUND OF THE INVENTION

This invention generally relates to coatings for components exposed to high temperatures, such as the hostile thermal environment of a gas turbine engine. More particularly, this invention is directed to a ceramic coating for such components that exhibits low thermal conductivity and resistance to spallation.

Components within the hot gas path of gas turbine engines are often protected by a ceramic coating, commonly referred to as a thermal barrier coating (TBC). TBC's are typically formed of ceramic materials deposited by thermal spraying and physical vapor deposition (PVD) techniques. Thermal spraying techniques, which include plasma spraying (air, vacuum and low pressure) and high velocity oxy-fuel (HVOF), deposit TBC material in the form of molten "splats," resulting in a TBC characterized by noncolumnar, irregular flattened grains and a degree of inhomogeneity and porosity. TBC's employed in the highest temperature regions of gas turbine engines are most often deposited by PVD, particularly electron-beam PVD (EBPVD), which yields a porous, strain-tolerant columnar grain structure that is able to expand and contract without causing damaging stresses that lead to spallation. Similar columnar microstructures can be produced using other atomic and molecular vapor processes, such as sputtering (e.g., high and low pressure, standard or collimated plume), ion plasma deposition, and all forms of melting and evaporation deposition processes (e.g., laser melting, etc.).

Various ceramic materials have been proposed as TBC's, the most widely used being zirconia ($ZrO_2$) partially or fully stabilized by yttria ($Y_2O_3$), magnesia (MgO), or ceria ($CeO_2$) to yield a tetragonal crystal structure that resists phase changes. Other stabilizers have been proposed for zirconia, including hafnia ($HfO_2$) (U.S. Pat. No. 5,643,474 to Sangeeta), gadolinium oxide (gadolinia; $Gd_2O_3$) (U.S. Pat. Nos. 6,177,200 and 6,284,323 to Maloney), and dysprosia ($Dy_2O_3$), erbia ($Er_2O_3$), neodymia ($Nd_2O_3$), samarium oxide ($Sm_2O_3$), and ytterbia ($Yb_2O_3$) (U.S. Pat. No. 6,890,668 to Bruce et al.). Still other proposed TBC materials include ceramic materials with the pyrochlore structure $A_2B_2O_7$, where A is lanthanum, gadolinium or yttrium and B is zirconium, hafnium and has been the most widely used TBC material. Reasons for this preference for YSZ are believed to include its high temperature capability, low thermal conductivity, and relative ease of deposition by thermal spraying and PVD techniques.

TBC materials that have lower thermal conductivities than YSZ offer a variety of advantages, including the ability to operate a gas turbine engine at higher temperatures, increased part durability, reduced parasitic cooling losses, and reduced part weight if a thinner TBC can be used. As is known in the art, conventional practice is to stabilize zirconia with yttria (or another of the above-noted oxides) to inhibit a tetragonal to monoclinic phase transformation at about 1000° C., which results in a volume expansion that can cause spallation. At room temperature, the more stable tetragonal phase is obtained and the undesirable monoclinic phase is minimized if zirconia is stabilized by at least about six weight percent yttria. An yttria content of seventeen weight percent or more ensures a fully stable cubic (fluorite-type) phase. Though the thermal conductivity of YSZ decreases with increasing yttria content, the conventional practice has been to partially stabilize zirconia with six to eight weight percent yttria (6-8% YSZ) to promote spallation resistance. As such, ternary systems have been proposed to reduce the thermal conductivity of YSZ. For example, commonly-assigned U.S. Pat. No. 6,586,115 to Rigney et al. discloses a YSZ TBC alloyed to contain an additional oxide that lowers the thermal conductivity of the base YSZ composition by increasing crystallographic defects and/or lattice strains. These additional oxides include alkaline-earth metal oxides (magnesia, calcia (CaO), strontia (SrO) and barium oxide (BaO)), rare-earth metal oxides (ceria, gadolinia, neodymia, dysprosia and lanthana ($La_2O_3$)), and/or such metal oxides as nickel oxide (NiO), ferric oxide ($Fe_2O_3$), cobaltous oxide (CoO), and scandium oxide ($Sc_2O_3$). Another ternary YSZ coating system that exhibits both reduced and more stable thermal conductivity is YSZ+ niobia ($Nb_2O_3$) or titania ($TiO_2$), as disclosed in U.S. Pat. No. 6,686,060 to Bruce et al. Finally, U.S. Pat. No. 6,025,078 to Rickerby et al. discloses YSZ modified to contain at least five weight percent gadolinia, dysprosia, erbia, europia ($Eu_2O_3$), praseodymia ($Pr_2O_3$), urania ($UO_2$), or ytterbia to reduce phonon thermal conductivity.

Additions of oxides to YSZ coating systems have also been proposed for purposes other than lower thermal conductivity. For example, U.S. Pat. No. 6,352,788 to Bruce teaches that YSZ containing about one up to less than six weight percent yttria in combination with magnesia and/or hafnia exhibits improved impact resistance. In addition, U.S. Pat. No. 7,060,365 to Bruce discloses that small additions of lanthana, neodymia and/or tantala to zirconia partially stabilized by about four weight percent yttria (4% YSZ) can improve the impact and erosion resistance of 4% YSZ. U.S. Pat. No. 4,753,902 to Ketcham discloses sintered zirconia-based ceramic materials containing yttria or a rare-earth metal oxide as a stabilizer and further containing at least five molar percent (about 3.0 weight percent) titania for the purpose of minimizing the amount of stabilizer required to maintain the tetragonal phase. Finally, U.S. Pat. No. 4,774,150 to Amano et al. discloses that bismuth oxide ($Bi_2O_3$), titania, terbia ($Tb_4O_7$), europia and/or samarium oxide may be added to certain layers of a YSZ TBC for the purpose of serving as "luminous activators."

The service life of a TBC system is typically limited by a spallation event brought on by thermal fatigue, which results from thermal cycling and the different coefficients of thermal expansion (CTE) between ceramic materials and the metallic bond coat and substrate materials on which they are deposited. An oxidation-resistant bond coat is often employed to promote adhesion and extend the service life of a TBC, as well as protect the underlying substrate from damage by oxidation and hot corrosion attack. Bond coats used on superalloy substrates are typically in the form of an overlay coating such as MCrAIX (where M is iron, cobalt and/or nickel, and X is yttrium or a rare-earth element), or a diffusion aluminide coating. During the deposition of the ceramic TBC and subsequent exposures to high temperatures, such as during engine operation, these bond coats form a tightly adherent alumina ($Al_2O_3$) layer or scale that adheres the TBC to the bond coat.

Though considerable advances in TBC materials have been achieved as noted above, there remains a need for improved TBC materials that exhibit both low thermal conductivities and resistance to spallation.

BRIEF SUMMARY OF THE INVENTION

The present invention provides a ceramic material suitable for use as a coating, particularly a porous thermal barrier coating (TBC), on a component intended for use in a hostile thermal environment, such as the superalloy turbine, combustor and augmentor components of a gas turbine engine. The coating material is a zirconia-based ceramic that has a predominantly tetragonal phase crystal structure and is capable of exhibiting both lower thermal conductivity and improved thermal cycle fatigue life in comparison to conventional 6-8% YSZ.

According to the invention, the coating material has a porous microstructure and consists essentially of zirconia stabilized by at least one rare-earth metal oxide and further alloyed to contain a limited amount of titania. Rare-earth metal oxides of particular interest to the invention are lanthana, ceria, neodymia, europia, gadolinia, and ytterbia, individually or in combination. Zirconia, the rare-earth metal oxide, and titania are present in the coating material of this invention in amounts to yield a predominantly tetragonal phase crystal structure. The amount of titania in the coating is tailored to allow higher levels of stabilizer while maintaining the tetragonal phase, i.e., avoiding the cubic (fluorite) phase. The amount of titania in the coating is also believed to increase the thermal cycle fatigue life, improve the impact and erosion resistance, and reduce the thermal conductivity of the ceramic coating.

The coating of this invention can be readily deposited by PVD to have a porous, strain-resistant columnar grain structure, which reduces the thermal conductivity and promotes the strain tolerance of the coating. Alternatively, the coating can be deposited by thermal spraying to have porous microstructure characterized by noncolumnar, splat-shaped grains.

Other objects and advantages of this invention will be better appreciated from the following detailed description.

DETAILED DESCRIPTION OF THE INVENTION

Figure 1:
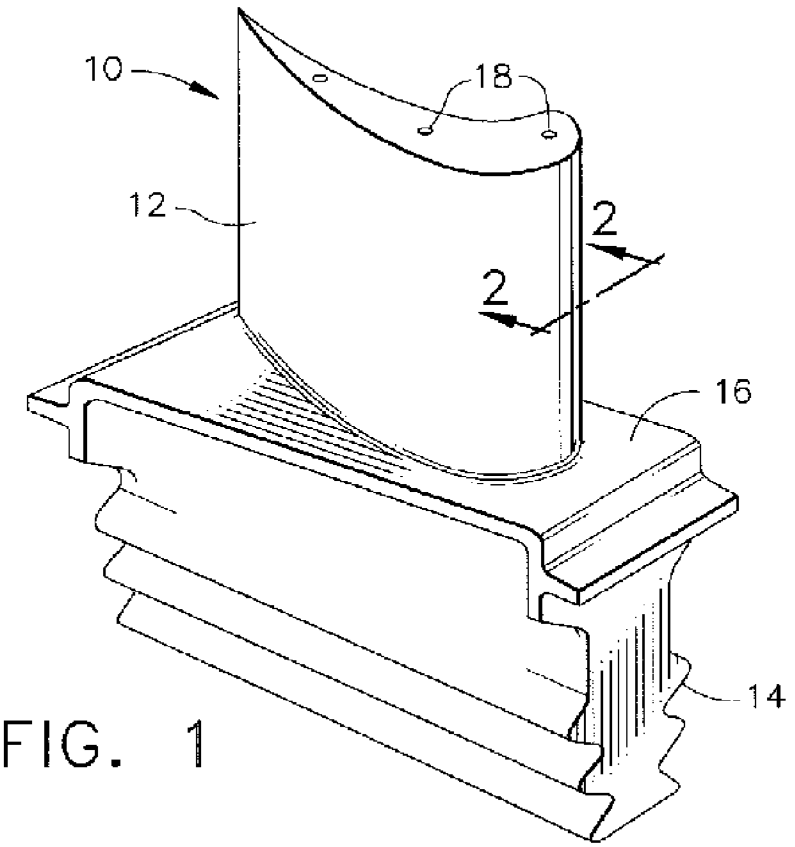
FIG. 1 is a perspective view of a high pressure turbine blade.

The present invention is generally applicable to components subjected to high temperatures, and particularly to components such as the high and low pressure turbine nozzles and blades, shrouds, combustor liners and augmentor hardware of gas turbine engines. An example of a high pressure turbine blade 10 is shown in FIG. 1. The blade 10 generally includes an airfoil 12 against which hot combustion gases are directed during operation of the gas turbine engine, and whose surface is therefore subjected to hot combustion gases as well as attack by oxidation, corrosion and erosion. The airfoil 12 is protected from its hostile operating environment by a thermal barrier coating (TBC) system schematically depicted in FIG. 2. The airfoil 12 is anchored to a turbine disk (not shown) with a dovetail 14 formed on a root section 16 of the blade 10. Cooling passages 18 are present in the airfoil 12 through which bleed air is forced to transfer heat from the blade 10. While the advantages of this invention are particularly desirable for high pressure turbine blades of the type shown in FIG. 1, the teachings of this invention are generally applicable to any component on which a thermal barrier coating may be used to protect the component from a high temperature environment.

Figure 2:
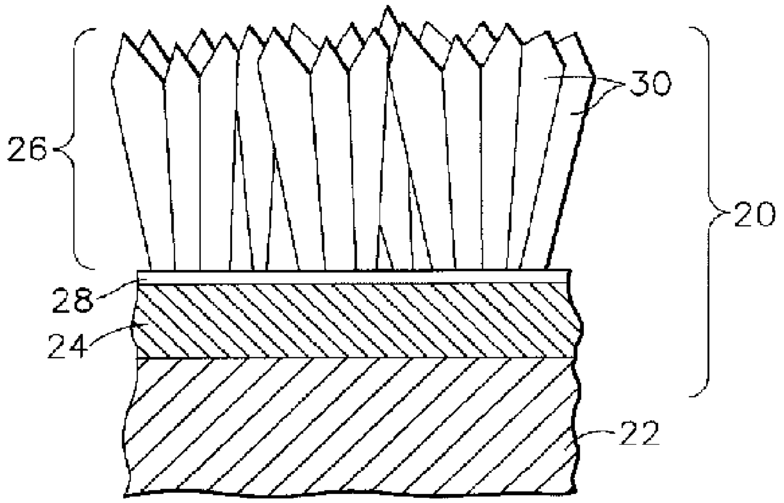
FIG. 2 schematically represents a cross-sectional view of the blade of FIG. 1 along line 2-2, and shows a thermal barrier coating system on the blade in accordance with a preferred embodiment of the invention.

The TBC system 20 is represented in FIG. 2 as including a metallic bond coat 24 that overlies the surface of a substrate 22, the latter of which is typically a superalloy and the base material of the blade 10. As is typical with TBC systems for components of gas turbine engines, the bond coat 24 is preferably an aluminum-rich composition, such as an overlay coating of an MCrAlX alloy or a diffusion coating such as a diffusion aluminide or a diffusion platinum aluminide of a type known in the art. Aluminum-rich bond coats of this type develop an aluminum oxide (alumina) scale 28, which grows by oxidation of the bond coat 24. The alumina scale 28 chemically bonds a TBC 26, formed of a thermal-insulating material, to the bond coat 24 and substrate 22. The TBC 26 of FIG. 2 is represented as having a porous, strain-tolerant microstructure of columnar grains 30. As known in the art, such columnar microstructures can be achieved by depositing the TBC 26 using a physical vapor deposition technique, such as EBPVD. The invention is also believed to be applicable to noncolumnar TBC deposited by such methods as thermal spraying, including air plasma spraying (APS). A TBC of this type is in the form of molten "splats," resulting in a microstructure characterized by irregular flattened grains and a degree of inhomogeneity and porosity. In either case, the microstructure of the TBC 26 is desired to be porous to minimize thermal conduction through the TBC 26, and as such the TBC 26 is distinguishable from sintered ceramic materials of the type disclosed by U.S. Pat. No. 4,753,902 to Ketcham. As with prior art TBC's, the TBC 26 of this invention is intended to be deposited to a thickness that is sufficient to provide the required thermal protection for the underlying substrate 22 and blade 10, generally on the order of about 75 to about 300 micrometers.

Commonly-assigned U.S. Pat. No. 6,890,668 to Bruce et al. discloses zirconia-based TBC materials stabilized with sufficient dysprosia, erbia, neodymia, samarium oxide, or ytterbia to intentionally contain the stable cubic (fluorite-type) crystal structure of zirconia. According to Bruce et al., TBC materials of zirconia stabilized by these rare-earth metal oxides exhibit low thermal conductivities (about 0.95 W/mK or less as compared to above about 1.6 W/mK for 6-8% YSZ) and have stable cubic crystal structures over a wide range of their respective phase diagrams. However, further improvements in thermal cycle fatigue life (spallation resistance) would be desirable. In particular, zirconia stabilized with dysprosia, erbia, neodymia, samarium oxide, or ytterbia in amounts above 10 weight percent have exhibited lower spallation, impact, and erosion resistance than 6-8% YSZ.

According to the present invention, greater spallation resistance can be achieved in a zirconia-based TBC coating stabilized by a rare-earth metal oxide through additions of titania in amounts sufficient to increase the content range over which the rare-earth metal oxide stabilizer can be used, thereby achieving the low thermal conductivities sought by Bruce et al., while predominantly retaining the tetragonal crystal phase of zirconia, in other words, avoiding the cubic crystal phase sought by Bruce et al. In this respect, the titania content in the TBC 26 tends to be less than the rare-earth oxide content in the TBC 26. The stabilized zirconia TBC 26 of this invention is believed to be more spallation resistant based on the premise that the tetragonal phase of zirconia has higher fracture toughness than the monoclinic and cubic phases of zirconia. Titania is also believed to increase the toughness of the TBC 26 as a result of titanium being tetravalent, thereby having the capability of improving the impact and erosion resistance of the TBC 26. As a result of titania having a smaller ion size (0.69 Angstrom) than zirconia (0.79 Angstrom), the TBC 26 of this invention is capable of lower and more stable thermal conductivities than otherwise attainable with zirconia stabilized by a rare-earth metal oxide alone. In combination with increased microstructural stability, a relatively low and stable thermal conductivity is believed to be possible over the life of the TBC 26. Finally, titania also has the benefit of reducing the density of the TBC 26.

Rare-earth metal oxides of interest to the invention are the oxides of lanthanum, cerium, neodymium, europium, gadolinium, erbia, dysprosia, and ytterbium, individually or in combination. Because of the presence of titania in the TBC 26, the rare-earth metal oxide stabilizer can be present in amounts exceeding 10 weight percent while predominantly retaining the tetragonal phase crystal structure, for example, the tetragonal phase constitutes at least 50 volume percent and more preferably at least 80 volume percent of the TBC microstructure. The stabilizer can be any combination of the rare-earth metal oxides in a combined amount of, by weight, about 2 to 20%, more preferably 6 to 14%, and most preferably 6 to 12%. Titania is present in amounts of, by weight, about 0.5 to 10%, more preferably up to 6%, and as little as up to 2%, with a preferred range believed to be 2 to 4%. The TBC 26 with its chemistry within these ranges has a stable, predominantly tetragonal crystal structure over the expected temperature range to which the TBC 26 would be subjected if deposited on a gas turbine engine component. These compositions are also believed to have a lower thermal conductivity and greater fracture toughness than binary YSZ, particular 6-8% YSZ. Four-component systems can be formed of these compositions by adding a limited amount of yttria, generally up to eight weight percent and preferably up to four weight percent, to further promote thermal cycle fatigue life.

While the invention has been described in terms of a preferred embodiment, it is apparent that other forms could be adopted by one skilled in the art. Accordingly, the scope of the invention is to be limited only by the following claims.

What is claimed is:

1. A component comprising a ceramic coating formed of an unsintered ceramic material having a porous microstructure and consisting of zirconia, about 2 to about 20 weight percent of at least one rare earth metal oxide as a stabilizer, about 0.5 to about 10 weight percent titania, and optionally up to about 8 weight percent yttria, the rare earth metal oxide and the titania being present in amounts to achieve a predominantly tetragonal crystal phase in the coating, wherein:

the at least one rare-earth metal oxide is chosen from the group consisting of lanthana, ceria, neodymia, europia, gadolinia, erbia, dysprosia, and ytterbia; and either the ceramic material consists of zirconia, titania, and at least one of lanthana, ceria, neodymia, europia, gadolinia, and ytterbia as the at least one rare-earth metal oxide; or the ceramic material consists of zirconia, titania, at least one of lanthana, ceria, dysprosia, erbia and ytterbia as the at least one rare-earth metal oxide, and optionally yttria.

2. A component comprising a ceramic coating formed of an unsintered ceramic material having a porous microstructure and consisting of zirconia, about 2 to about 20 weight percent of one rare earth metal oxide chosen from the group consisting of oxides of lanthanum, cerium, neodymium, europium, gadolinium, erbium, dysprosium, and ytterbium, and about 0.5 to about 10 weight percent titania, the rare earth metal oxide and the titania being present in amounts to achieve a predominantly tetragonal crystal phase in the coating.

3. The component according to claim 2, wherein the ceramic material contains 6 to 14 weight percent of the rare-earth metal oxide.

4. The component according to claim 2, wherein the ceramic material contains 6 to 12 weight percent of the rare-earth metal oxide.

5. The component according to claim 2, wherein the ceramic material contains up to 6 weight percent titania.

6. The component according to claim 2, wherein the ceramic material contains 2 to 3 weight percent titania.

7. The component according to claim 2, wherein the component is a gas turbine engine component.

8. A gas turbine engine component comprising:

a superalloy substrate;

a metallic bond coat on a surface of the substrate; and a thermal barrier layer as an outermost coating of the component, the thermal barrier layer being formed by an unsintered ceramic material having a porous microstructure of columnar grains and a predominantly tetragonal crystal structure, the ceramic material consisting of zirconia, one rare earth metal oxide in an amount of 2 to 20 weight percent, and 0.5 to 10 weight percent titania, the rare-earth metal oxide being chosen from the group consisting of lanthana, ceria, neodymia, europia, gadolinia, erbia, dysprosia, and ytterbia.

9. The gas turbine engine component according to claim 8, wherein the rare-earth metal oxide is lanthana.

10. The gas turbine engine component according to claim 8, wherein the rare-earth metal oxide is ceria.

11. The gas turbine engine component according to claim 8, wherein the rare-earth metal oxide is neodymia.

12. The gas turbine engine component according to claim 8, wherein the rare-earth metal oxide is europia.

13. The gas turbine engine component according to claim 8, wherein the rare-earth metal oxide is gadolinia.

14. The gas turbine engine component according to claim 8, wherein the rare-earth metal oxide is erbia.

15. The gas turbine engine component according to claim 8, wherein the rare-earth metal oxide is dysprosia.

16. The gas turbine engine component according to claim 8, wherein the rare-earth metal oxide is ytterbia.

17. The gas turbine engine component according to claim 8, wherein the ceramic material contains up to 2 weight percent titania.

18. The gas turbine engine component according to claim 8, wherein the ceramic material contains 2 to 3 weight percent titania.

19. The gas turbine engine component according to claim 8, wherein the ceramic material contains 6 to 12 weight percent of the rare-earth metal oxide.

* * * * *